United States Patent [19]
Tunis, III et al.

[11] Patent Number: 5,904,972
[45] Date of Patent: May 18, 1999

[54] LARGE COMPOSITE CORE STRUCTURES FORMED BY VACUUM ASSISTED RESIN TRANSFER MOLDING

[75] Inventors: George C. Tunis, III, Wilmington, Del.; Steven J. Winckler, Troy, N.Y.

[73] Assignee: TPI Technology Inc., Warren, R.I.

[21] Appl. No.: 08/900,687

[22] Filed: Jul. 25, 1997

Related U.S. Application Data

[63] Continuation-in-part of application No. 08/612,251, Mar. 7, 1996, which is a continuation-in-part of application No. 08/475,849, Jun. 7, 1995.

[51] Int. Cl.$^6$ ............................... B32B 1/00; B32B 3/20
[52] U.S. Cl. ..................... 428/178; 428/72; 428/188; 428/118; 52/793.1
[58] Field of Search ..................... 428/188, 116, 428/118, 72, 178; 52/793.1

[56] References Cited

U.S. PATENT DOCUMENTS

| | | | |
|---|---|---|---|
| 2,913,036 | 11/1959 | Smith | 154/1.6 |
| 3,146,148 | 8/1964 | Mitchella et al. | 156/382 |
| 3,309,450 | 3/1967 | Rodgers | 244/257 |
| 4,125,526 | 11/1978 | McCready | 264/90 |
| 4,132,755 | 1/1979 | Johnson | 264/553 |
| 4,217,157 | 8/1980 | Stoltze et al. | 156/87 |
| 4,223,053 | 9/1980 | Brogan | 428/188 |

(List continued on next page.)

FOREIGN PATENT DOCUMENTS

| | | |
|---|---|---|
| 1504274 | 2/1968 | France . |
| 50-3098 | 1/1975 | Japan . |
| 3162933 | 7/1991 | Japan . |
| 9200963 | 1/1993 | Netherlands . |

OTHER PUBLICATIONS

P. Lazarus, "Reverse MACT", *Professional BoatBuilder Magazine*, Oct./Nov., 1994, No. 31, p. 3.

P. Lazarus, "Infusion", *Part One, Professional BoatBuilder Magazine*, Oct./Nov., 1994, No. 31.

P. Lazarus, "Infusion", *Part Two, Professional BoatBuilder Magazine*, Dec./Jan., 1995, No. 32, pp. 28–34.

Film Technology, Inc., Advertisement for Quick Draw™ Films, *High–Performance Composites 1995 Sourcebook*, p. 29.

W. Sutliff, "Composites Promised Affordable Ship Structures", *Centerline*, May–Jun., 1991, pp. 1–4.

L.H. Walker, "Low Cost, High Quality Composite Ship Structures Technology Demonstrated", Research Release, Carderock Division, Naval Surface Warfare Center, May 1993, pp. 1–4.

*Primary Examiner*—Donald Loney
*Attorney, Agent, or Firm*—Cantor Colburn LLP

[57] ABSTRACT

Large composite structures are produced using a vacuum assisted resin transfer molding process. The structures incorporate cores, which may be hollow cells or foam blocks. A plurality of cores, each of which may be wrapped with a fiber material, is arranged in a layer on a mold with a fiber material arranged to form face skins. The assembly is sealed under a vacuum bag to a mold surface. One or more main feeder conduits are provided in communication with a resin distribution network of smaller channels which facilitates flow of uncured resin into and through the fiber material. The resin distribution network may comprise a network of grooves formed in the surfaces or the cores and/or rounded corners of the cores. The network of smaller channels may also be provided between the vacuum bag and the fiber material, either integrally in the vacuum bag or via a separate distribution medium. Resin, introduced under vacuum, travels relatively quickly through the main feeder channel(s) and the network of smaller channels. After penetrating the fiber material to reach the surface of the cores, the resin again travels relatively quickly along the cores via the grooves in the cores or the spaces provided by the rounded corners to penetrate the fiber material between the cores, if present, and between the cores and the mold.

15 Claims, 9 Drawing Sheets

U.S. PATENT DOCUMENTS

| | | | |
|---|---|---|---|
| 4,238,437 | 12/1980 | Rolston | 264/102 |
| 4,312,829 | 1/1982 | Fourcher | 264/571 |
| 4,359,437 | 11/1982 | Le Comte | 264/102 |
| 4,560,523 | 12/1985 | Plumley et al. | 264/102 |
| 4,665,678 | 5/1987 | Müller et al. | 428/128 |
| 4,676,041 | 6/1987 | Ford | 52/309.11 |
| 4,822,436 | 4/1989 | Callis et al. | 156/211 |
| 4,902,215 | 2/1990 | Seemann, III | 425/406 |
| 4,942,013 | 7/1990 | Palmer et al. | 264/511 |
| 4,975,311 | 12/1990 | Lindgren | 428/156 |
| 5,045,251 | 9/1991 | Johnson | 264/40.1 |
| 5,052,906 | 10/1991 | Seemann | 425/112 |
| 5,087,193 | 2/1992 | Herbert, Jr. | 425/543 |
| 5,096,651 | 3/1992 | Le Comte | 264/510 |
| 5,118,558 | 6/1992 | Horovitz | 428/188 |
| 5,123,985 | 6/1992 | Evans et al. | 156/213 |
| 5,129,813 | 7/1992 | Shepherd | 425/504 |
| 5,132,069 | 7/1992 | Newton | 264/257 |
| 5,304,339 | 4/1994 | Le Comte | 264/511 |
| 5,439,635 | 8/1995 | Seemann | 264/510 |

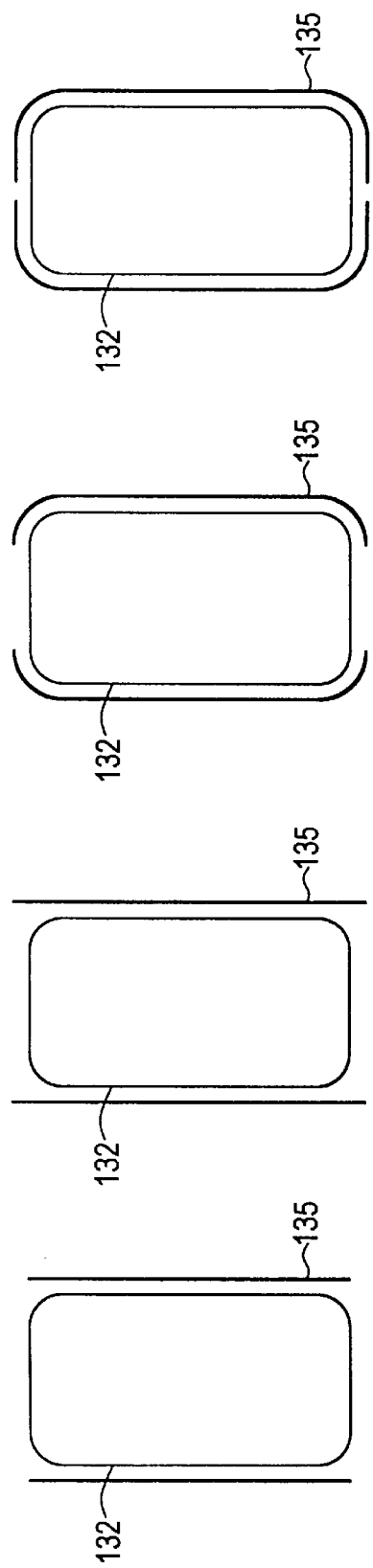
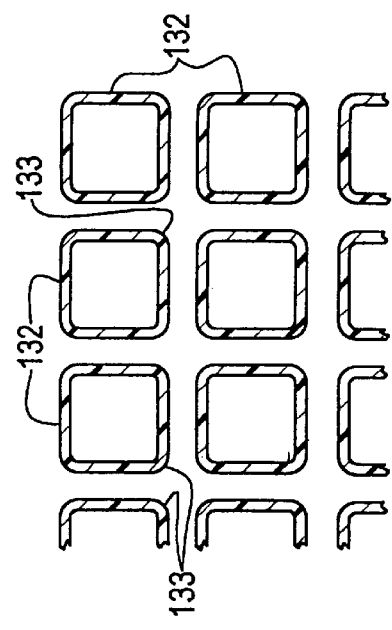
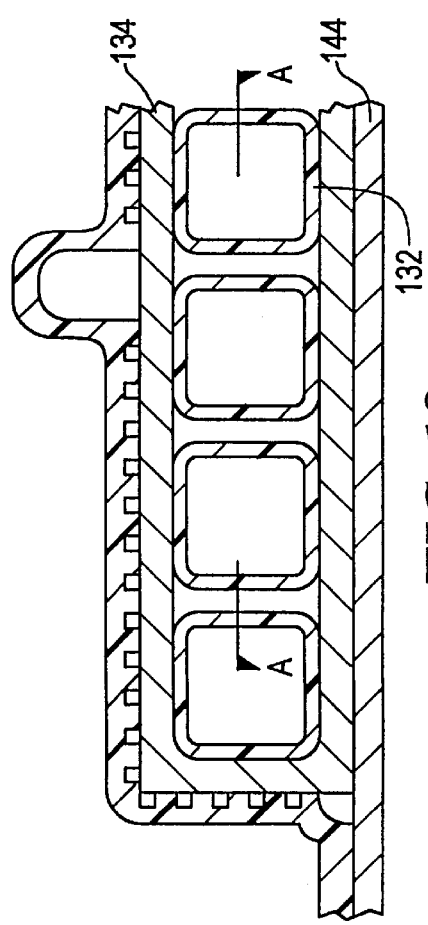
FIG. 17A  FIG. 17B  FIG. 17C  FIG. 17D
FIG. 18
FIG. 19

LARGE COMPOSITE CORE STRUCTURES FORMED BY VACUUM ASSISTED RESIN TRANSFER MOLDING

CROSS-REFERENCE TO RELATED APPLICATIONS

This application is a continuation-in-part of U.S. patent application Ser. No. 08/612,251, filed on Mar. 7, 1996 pending, which is a continuation-in-part of U.S. patent application Ser. No. 08/475,849, filed on Jun. 7, 1995 pending, the disclosures of both of which are incorporated herein by reference.

BACKGROUND OF THE INVENTION

Vacuum assisted resin transfer molding (VA-RTM) has been used to produce a number of large, fiber reinforced composite structures such as boat hulls which incorporate materials such as foam and balsa cores. The cores are covered with a fiber reinforced resin. In the VA-RTM process, the reinforcement fiber, such as a fabric or mat, is arranged in a single sided mold in a dry condition along with the desired core materials according to the form of the desired finished part. The lay-up is then encapsulated in a vacuum bag and impregnated with resin under vacuum. The resin is allowed to cure.

Various methods have been utilized to introduce and enhance the distribution of resin through the reinforcement fiber. These methods include the placement of a disposable distribution media over the outside layer of fabric and the incorporation of holes and/or slots penetrating through the core to allow resin to flow from the outer to the inner layer of reinforcement fiber. See, for example, U.S. Pat. Nos. 5,316,462 and 4,560,523. A supply groove in a foam core has also been used in a closed mold resin injection process to facilitate resin flow. See, for example, U.S. Pat. No. 5,096,651.

BRIEF SUMMARY OF THE INVENTION

The present invention relates to a method for distributing resin during the manufacture of large composite structures using a vacuum assisted resin transfer molding (VA-RTM) process and the composite structure produced by this method. The composite structure is formed from internal cores surrounded by fiber reinforced resin. In one embodiment of the invention, resin is supplied directly into a network of main feeder grooves which are interconnected to a series of smaller microgrooves formed in the surface of the internal cores. From the feeder grooves and microgrooves, the resin flows outwardly from the core to penetrate the reinforcement fiber. In a second embodiment of the invention, a separate distribution medium is interposed between the internal core and the fiber reinforcement. The resin is supplied directly to one or more main feeder grooves in the core surface and penetrates the reinforcement fiber via the distribution medium. Also, the main feeder grooves can extend around the cores to form supply loops, allowing impregnation of transverse structural members.

In a further embodiment, an integrated vacuum bag and mold are formed from a textured sheet of metal. The texture is formed by closely spaced upraised portions on one side of the sheet which correspond with depressions on the other side of the sheet. The closely spaced upraised portions define valleys therebetween which form a resin distribution network. Main feeder grooves are formed directly in the sheet. The textured sheet can also be used as a mold from which other tools are made.

In a still further embodiment, the structure incorporates cores, which may be hollow cells, having a network of small channels or grooves formed in their surfaces and/or rounded corners to facilitate resin flow. The cells are closed, hollow containers formed by, for example, blow molding of a suitable plastic material. A plurality of cores is arranged in an appropriate configuration to form the desired structure against a rigid mold surface of a mold assembly. The cores may be surrounded by fiber reinforcement. The mold assembly includes a flexible portion, typically a vacuum bag, which is placed over the structure, with a vacuum conduit about the periphery of the part, and sealed to the rigid mold surface. The vacuum bag includes one or more main feeder conduits formed therein. A network of smaller channels may be provided, either integrally formed in the vacuum bag in fluid communication with the main feeder conduits or via a separate distribution medium laid between the vacuum bag and the fiber reinforcement. Resin is introduced under vacuum to the main feeder channels in the vacuum bag and travels relatively quickly into and along the smaller channels. From the smaller channels, the resin infiltrates the fiber reinforcement over the top of the cores until it reaches the surface of the cores. The resin then flows relatively quickly along the cores via the grooves formed in the surfaces of the cores and/or the spaces defined by the rounded corners. From there, the resin penetrates the reinforcement in the regions between adjacent cores, if present, and the reinforcement between the bottom of the cores and the rigid mold surface. After the resin has cured, the vacuum bag, and separate distribution medium if used, are removed and the finished part is separated from the mold. The cores remain in the finished part.

With this method, large composite structures which require multiple cores can be formed quickly prior to the gel time of typical vinyl ester or polyester resins, and the amount of resin used can be minimized. By supplying the resin directly through the vacuum bag into the feeder grooves, the supply is not limited to a part edge or inlet in a tool. Adjacent cores can be supplied via a single resin inlet. The resin distribution network can remain in the finished part, eliminating disposal of distribution materials. In this case, the microgrooves are filled with resin after curing, thereby increasing interlaminar shear strength and delamination strength. Structural features such as shear ties, compression webs, or beams can be incorporated directly into the composite part during the molding process.

BRIEF DESCRIPTION OF THE DRAWINGS

The invention will be more fully understood from the following detailed description taken in conjunction with the accompanying drawings in which:

FIGS. 17A, 17B, 17C, and 17D illustrate a variety of fiber wrapping configurations;

FIG. 18 is a schematic, partial cross-sectional view of a composite structure and mold assembly according to a still further embodiment of the invention;

FIG. 19 is a partial cross-sectional view along line A—A of FIG. 18;

DETAILED DESCRIPTION OF THE INVENTION

Figure 1:
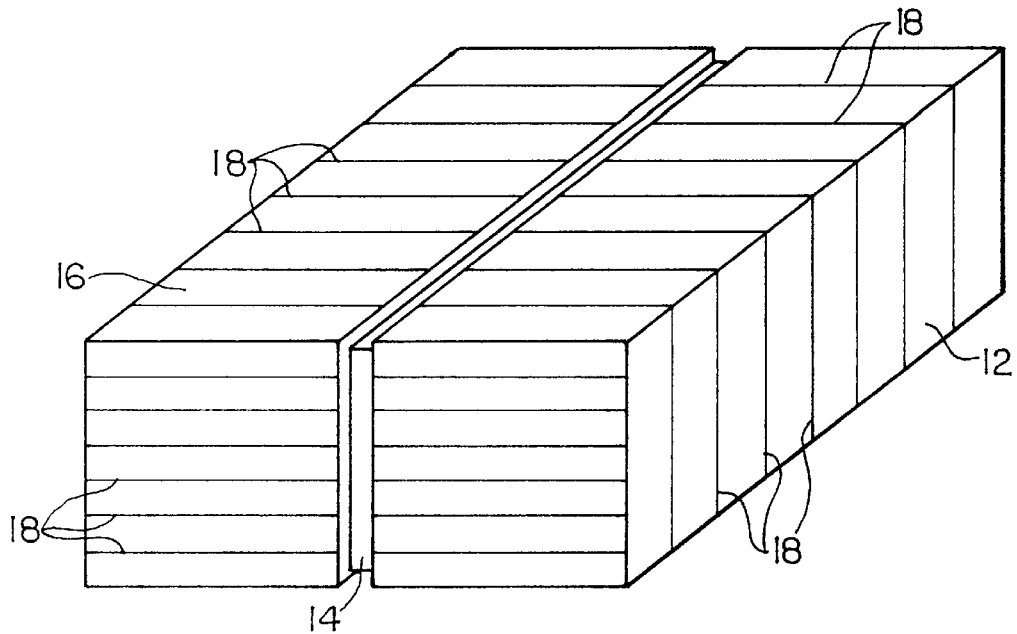
FIG. 1 is a perspective view of a core for a composite structure according to a first embodiment of the present invention.

A large composite part made according to the present invention includes a core 12, shown in FIG. 1. The core is made from a material able to support the pressure of a vacuum. Typical materials include foams, such as a polyurethane or a polyvinyl chloride, or balsa wood. The core can be solid or hollow, such as a blown polyethylene. Concrete may also be used. The core is shown as a rectangular block, although other configurations are possible, as discussed further below.

One or more main feeder grooves or channels 14 are provided in the surface 16 of the core. The main feeder groove may circumscribe the entire core to form a loop. A resin distribution network comprising channels of a smaller cross-sectional area than the main feeder groove is provided in contact with the surface of the core for fluid communication with the main feeder groove.

In a first embodiment of the present invention, the resin distribution network is provided in the form of a plurality of microgrooves 18 machined in the surface 16 of the core 12, as shown in FIG. 1. The microgrooves 18 are generally arranged transversely to the main feeder groove 14. Some of the microgrooves may circumscribe the entire core to create a resin flow loop beginning and ending at the main feeder groove. The actual relation of the microgrooves to the main feeder groove depends on the geometry of the core and the optimization of the resin impregnation, as discussed further below.

Figure 2:
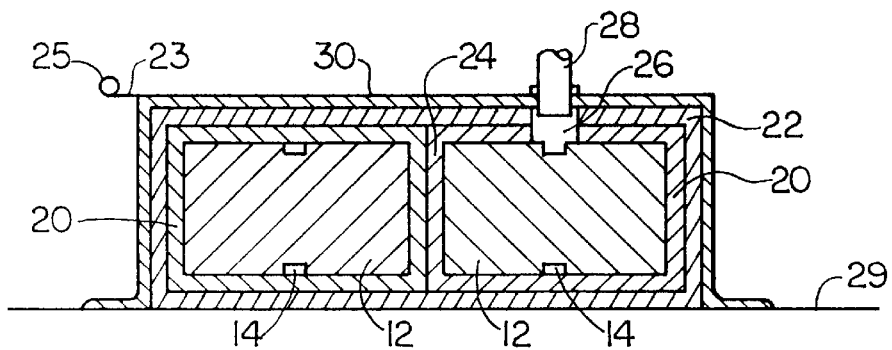
FIG. 2 is a schematic cross-sectional view of a composite structure being formed according to the first embodiment of the present invention.

The core 14 with the network of grooves is covered with one or more layers of a fiber material 20, illustrated schematically in FIG. 2. The fiber material may be a cloth or mat formed from fibers of glass, carbon, or other suitable material. Depending on the structural requirements of the desired finished part, the core may be completely surrounded with fiber material, or one or more surfaces of the core may be left free of fiber material. The fiber material may be wrapped in a sheet around the core, or individual pieces of fiber material may be applied to the desired core faces. The fiber may also be supplied in a tubular form into which the core is inserted.

A plurality of fiber wrapped cores are arranged to form the desired finished part. Although two cores are shown in FIG. 2, the actual number and arrangement of cores is determined by the desired finished part. One or more layers of a fiber material can be wrapped around a plurality of cores to form an outer skin 22, shown schematically in FIG. 2. The particular number of layers of fiber material, the type, and the arrangement depend on the desired finished part and can be readily determined by those of skill in the art. A bleeder layer is generally provided in the form of a tab 23 extending from an outer fiber layer to a vacuum outlet 25. Peel plies, typically required with prior art vacuum processes, are generally not needed with the process of the present invention.

The fiber material 24 surrounding and between the cores creates structural members such as shear ties, compression webs, and beams. For example, referring to FIG. 4, a plurality of triangular cores 40 are used to form a deck. The fiber material between adjacent triangular cores forms diagonal structural members 41 that support both compression and shear forces.

During the lay-up, suitable fittings 26, such as plastic or copper tees, are positioned in the main feeder grooves 14 to facilitate the subsequent insertion of resin supply tubes 28. One or more fittings may be positioned in each feeder groove, to accommodate the desired resin flow. The lay-up is placed against a mold 29, and a vacuum bag 30 is then placed over the lay-up, including the plastic fittings, and sealed to the mold in a manner known in the art, as shown schematically in FIG. 2. The vacuum bag is then punctured and the supply tubes 28 are inserted through the vacuum bag directly into their respective fittings 26. The supply tubes are sealed to the bag to retain vacuum integrity. In this manner, the main feeder grooves are supplied directly with resin by penetrating the outer vacuum bag with a supply tube that is inserted directly into the groove.

Figure 8:
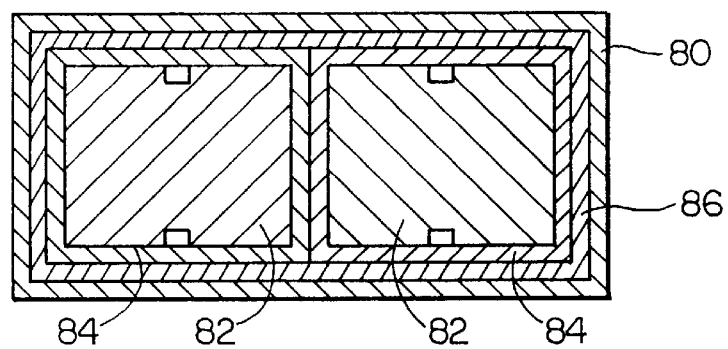
FIG. 8 is a schematic cross-sectional view of a composite structure being formed using an integrated mold and vacuum structure.

Referring to FIG. 8, the vacuum bag and mold may also be integrated into a single structure 80 which is rigid enough to retain its shape as a mold but flexible enough to collapse against the part upon application of a vacuum. For example, the integrated structure 80 may comprise a thin gauge steel sheet, such as 0.25 inch or thinner. The cores 82 and fiber material 84, 86, as described above, are encapsulated in the steel sheet. Holes are drilled through the sheet to access the fittings. Resin impregnation occurs as described above. The integrated structure may be formed of other suitable materials, such as rubber or silicone or a thin composite sheet material such as a plastic laminated metal.

Figure 9:
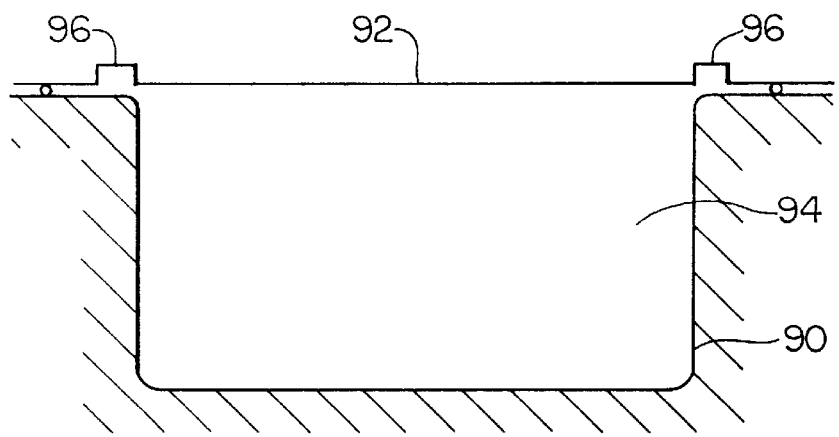
FIG. 9 is a schematic cross-sectional view of a rigid mold and flexible lid for forming a composite structure.

FIG. 9 illustrates a further mold embodiment in which a rigid mold 90 is sealed with a flexible lid 92 formed, for example, from a steel or plastic material. A part, comprising the cores and fiber material as described above, is placed in the recess 94 defined by the rigid mold. A vacuum groove 96 in the lid surrounds the part. Holes are provided through the lid or mold to access fittings for resin impregnation as described above. During impregnation of the resin under vacuum, the lid flexes at the edge of the vacuum groove, to allow compaction of the part.

Figure 3:
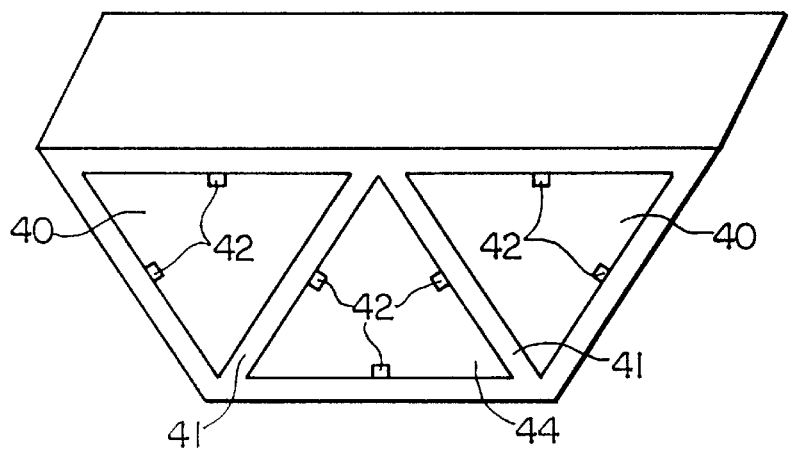
FIG. 3 is a schematic perspective view of a further composite structure being formed according to the present invention.
Figure 4:
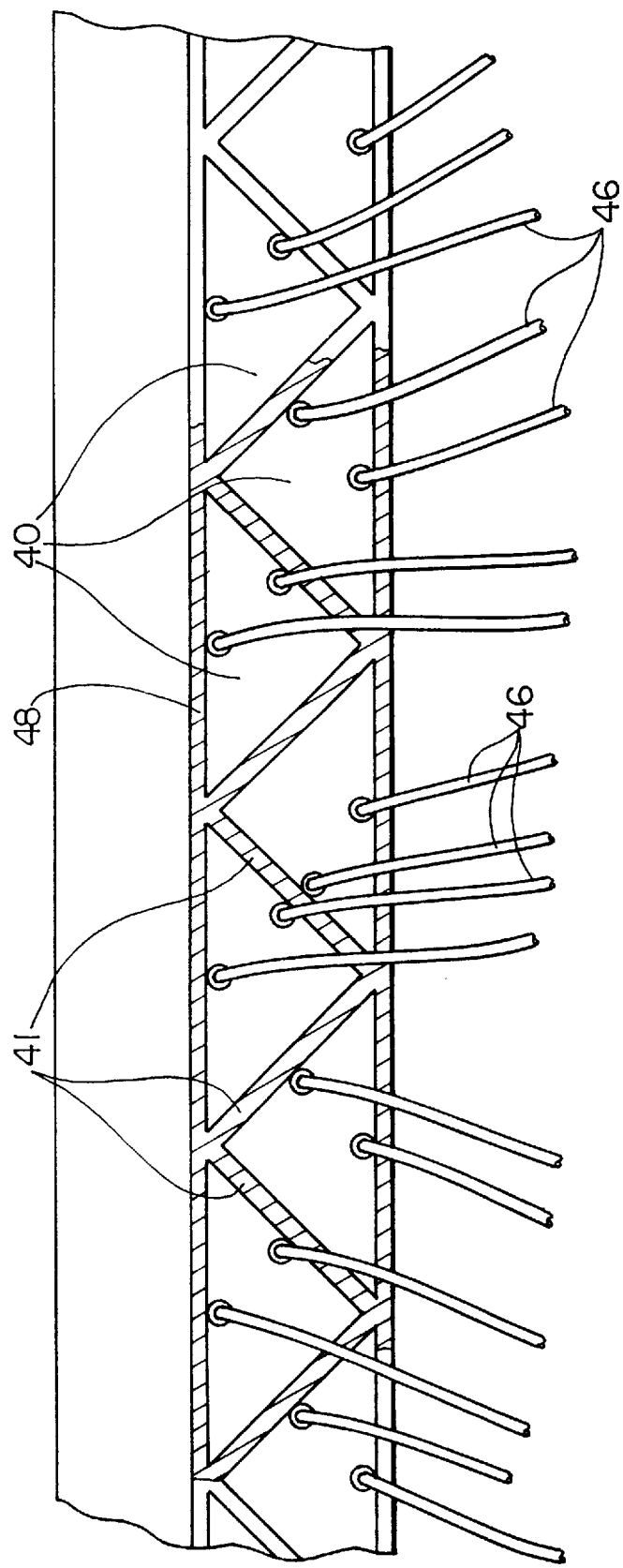
FIG. 4 is a perspective view of a composite structure being formed according to the present invention.

The resin, such as a polyester, vinyl ester, epoxy, phenolic, acrylic, or bismaleimide, travels relatively quickly through the main feeder grooves 14 and into the microgrooves 18. From the microgrooves, the resin penetrates the fiber material 20, 22. Impregnation results from resin infusion originating at the core surface 16 and migrating outwardly to the exterior of the part. The fiber material on adjacent core surfaces may be impregnated via a main feeder groove in one of the adjacent cores, as indicated in FIGS. 3 and 4.

Figure 10:
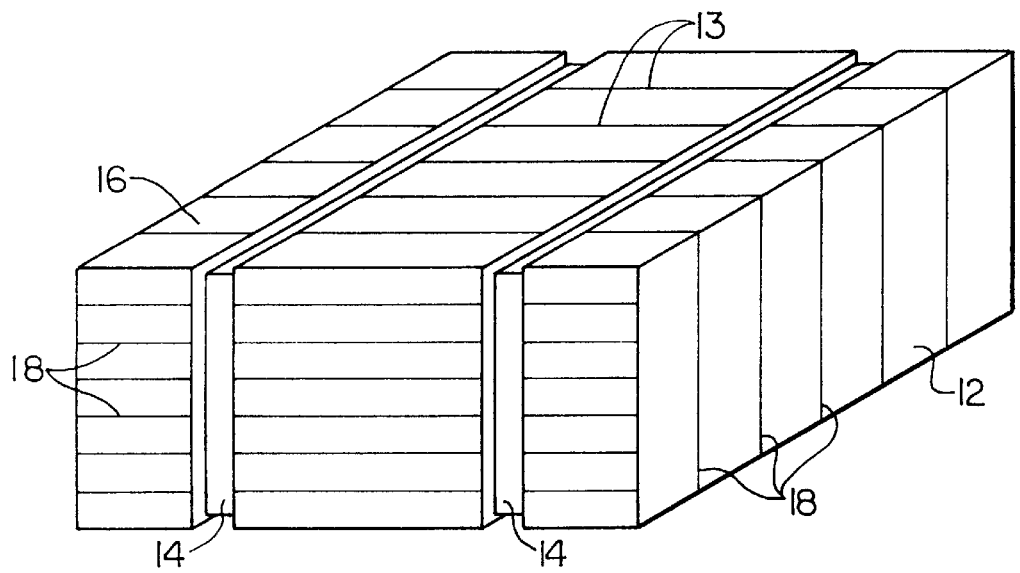
FIG. 10 is a perspective view of a core for a composite structure having multiple main feeder grooves.

The cross-sectional area of the main feeder groove and the cross-sectional area and spacing of the microgrooves are optimized to provide a suitable time to allow the resin to impregnate all of the fiber material before curing without leaving unimpregnated areas. A typical main feeder groove may have a depth of 0.5 inch and a width of 0.5 inch for a cross-sectional area of 0.25 square inches. Typical microgrooves may have a depth of 0.125 inch and a width of 0.125 inch for a cross-sectional area of approximately 0.016 square inches. The microgrooves may be spaced 1.0 inch on center. These dimensions may be modified to accommodate reinforcement fiber materials of different types and/or thicknesses. Also, the cross-sectional area of the main feeder grooves may be increased if the part is particularly large to more rapidly distribute the resin to all sections of the part. Similarly, multiple main feeder grooves 14 may be provided in a core 12, as indicated in FIG. 10.

In addition, the cross-sectional area of the main feeder grooves or the microgrooves may be reduced to create flow restrictions to increase resin dwell time at a particular area. Resin dwell time may also be increased by placing a resin "fuse" in the feeder groove which temporarily blocks the resin flow. The fuse dissolves after contact with the resin after a known period of time, which may be set by the length of the fuse. For example, with a vinyl ester resin, a styrofoam fuse has been used successfully. The feeder grooves may also terminate to redirect resin flow.

The main feeder grooves 14 allow passage of resin from one core to an adjacent core. Holes may be provided through the cores to connect main feeder grooves. Each main feeder groove may be supplied with resin simultaneously, creating parallel circuits, or in a prescribed sequence, creating series circuits, depending on the geometry and size of the part to be impregnated. Additionally, the main feeder grooves may be independent of each other, creating separate circuits.

After impregnation, the resin is allowed sufficient time to cure. Once cured, the microgrooves 18 are filled with solid resin. This resin provides a lateral locking mechanism which improves the interlaminar shear strength of the bond between the fiber reinforced composite and the core. The resin remaining in the groove network also increases the forces necessary to delaminate the fiber reinforced face skins from the core.

The actual arrangement and shape and number of cores depends on the desired finished part. For example, triangular cores 40 are shown in FIG. 3. The triangular cores may have main feeder grooves 42 provided in at least two surfaces. A central triangular core 44 may have main feeder grooves in three surfaces. Microgrooves are provided in the surfaces as described above. A plurality of triangular cores may be arranged in, for example, a row to form a deck. In this example, resin, supplied through tubes 46, is impregnated sequentially beginning at the central core and progressing toward the edges, as shown by the shaded region 48 in FIG. 4.

Figure 5:
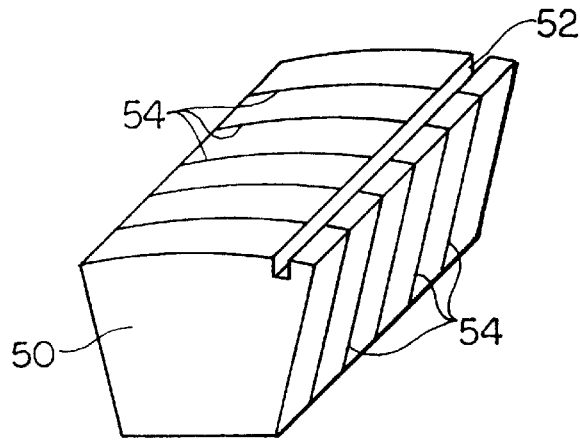
FIG. 5 is a perspective view of a further core for a composite structure according to the present invention.

An arcuate core 50 is shown in FIG. 5. The arcuate core 50 may have a main feeder groove 52 in one surface and a network of microgrooves 54 radiating from the feeder groove to circumscribe the core. The arcuate cores may be used to form curved structures such as boat hulls or arches.

Figure 6:
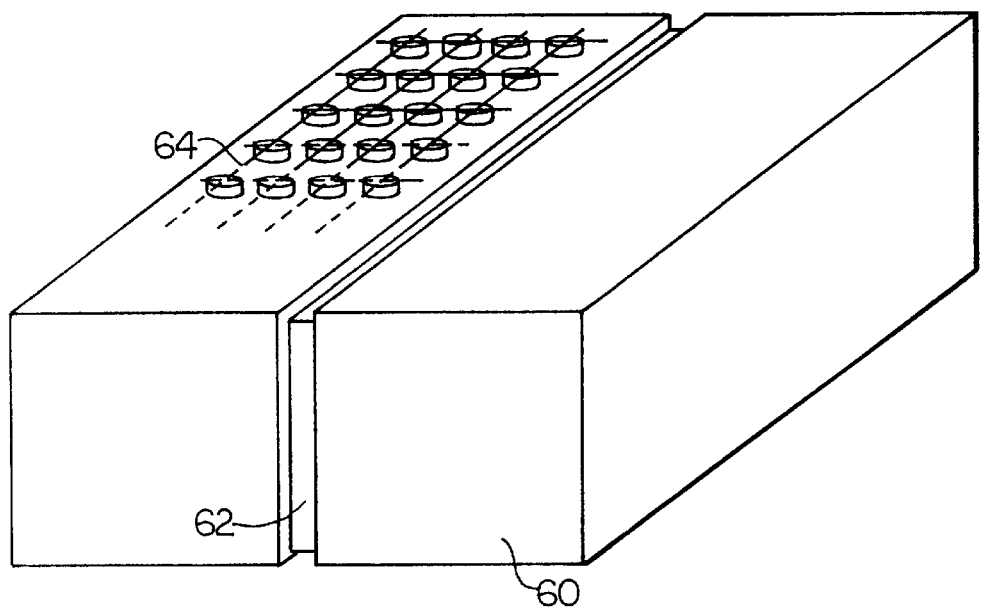
FIG. 6 is a perspective view of a core for a composite structure according to a second embodiment of the present invention.
Figure 7:
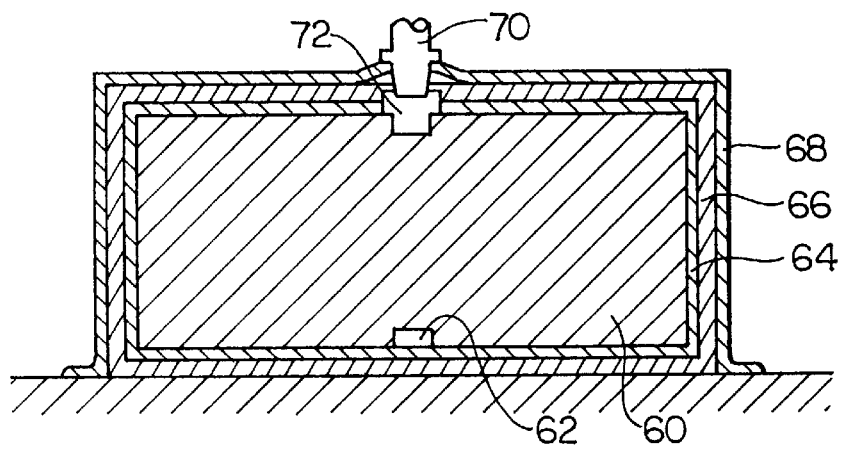
FIG. 7 is a schematic cross-sectional view of a composite structure being formed according to the second embodiment of the present invention.

In another embodiment of the present invention, illustrated in FIGS. 6 and 7, a core 60 is provided with a main feeder groove 62 as described above. A distribution medium 64 is then provided adjacent the core faces. The medium comprises a network of open passageways formed by a structure capable of maintaining the passageways in an open condition during application of the vacuum. For example, the medium may comprise intersecting filaments held in spaced relation from the core surface by post-like members located at each filament intersection, a grid-like structure of aligned strips, or an open weave fabric. Suitable distribution media are known for example, from U.S. Pat. Nos. 4,902,215 and 5,052,906, incorporated herein by reference. A fiber material 66 is then wrapped over the distribution media, as described above. A plurality of cores are arranged to form the desired finished part, and a vacuum bag 68 is placed over the cores and fiber material, as described above. Resin supply tubes 70 leading from a resin source are inserted through the bag 68 and fiber material 66 to fittings 72 in the main feeder grooves 62. The supply tubes 70 are sealed to the vacuum bag in a manner known in the art. Resin is fed through the supply tubes to the main feeder grooves. The resin travels relatively quickly through the main feeder grooves and into the distribution media. From the distribution media, the resin penetrates the fiber material. A suitable time interval is provided to allow the resin to cure.

Resin distribution media presents a more uniform resin flow front than the microgrooves. For this reason, resin distribution media are generally preferred for more complicated parts, whereas microgrooves are preferred to conserve resin, since less resin flows through the microgrooves.

Figure 11:
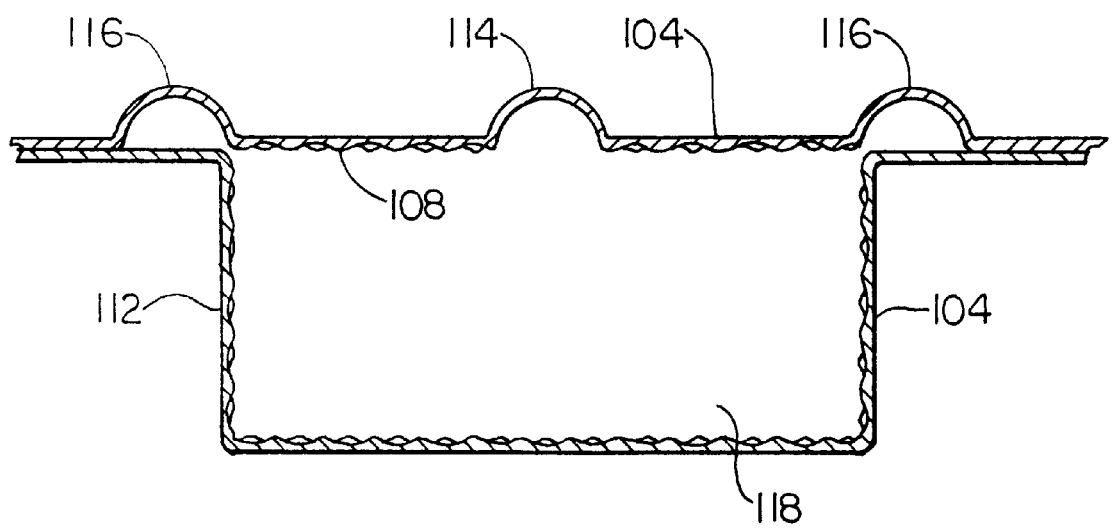
FIG. 11 is a schematic cross-sectional view of an integrated mold and vacuum bag for forming a composite structure according to a further embodiment of the present invention.
Figure 13:
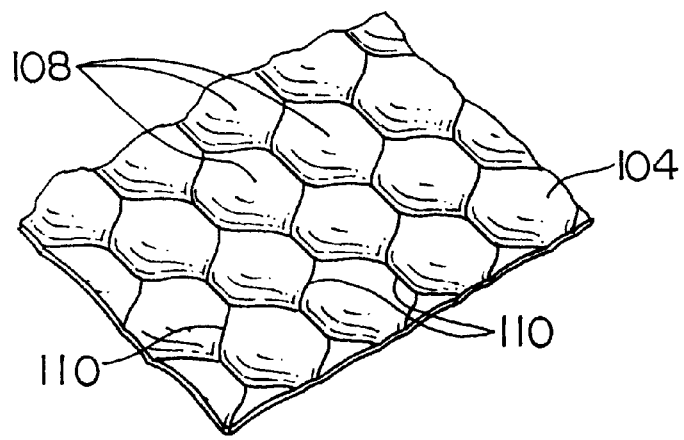
FIG. 13 is a perspective view of the other side of the textured sheet of FIG. 12.
Figure 12:
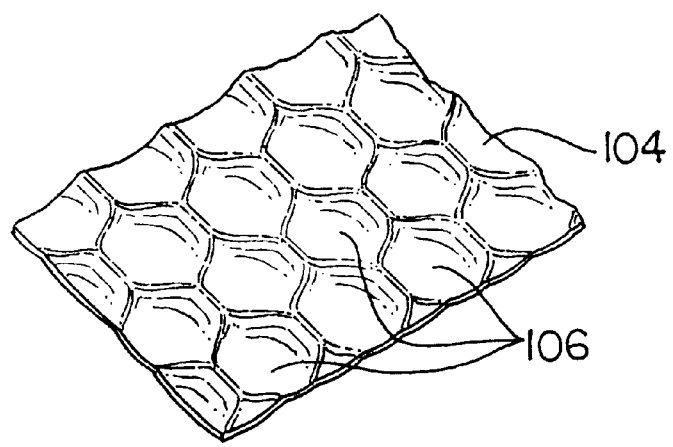
FIG. 12 is a perspective view of one side of a textured sheet of material forming the integrated mold and vacuum bag of FIG. 11.

In a further embodiment, illustrated in FIGS. 11 through 13, the vacuum bag and mold are integrated into a single tool 102 formed from a textured sheet 104 of metal, such as a thin gauge steel sheet. The sheet is rigid enough to retain its shape as a mold, but flexible enough to collapse or be pulled against the part under the vacuum applied during a resin impregnation process, discussed further below. A sheet thickness of 0.25 inch or less has been found suitable. A plastic or a composite material such as a metal and plastic laminate formed as a textured sheet may also be used.

Preferably, the texture is formed by closely spaced upraised portions 108 formed on one side of the sheet 104 which correspond to depressions 106 on the other side of the sheet. The closely spaced upraised portions 108 define valleys 110 therebetween which form a resin distribution network. For example, the upraised portions may have a generally hexagonal shape having a longest dimension of between ⅜ inch and ⁷⁄₁₆ inch. A depth of the valleys of approximately 30 thousandths of an inch has been found to be suitable. Such a textured sheet is readily formable and is commercially available from Ardmore Textured Metal of Edison, N.J. Alternatively, the texture could be provided on a single side of the sheet if desired, such that the upraised portions do not make corresponding depressions on the other side.

The sheet is shaped into the desired form of a mold 112 having a mold cavity 118 with the upraised portions of the sheet forming the interior walls of the cavity, thereby facing the part to be impregnated. Main feeder grooves 114 are formed directly in the sheet 104 in the desired locations, rather than in the cores as described above. The main feeder grooves may have dimensions as discussed above. Vacuum outlet channels 116 are formed around the perimeter of the tool.

To form a composite part, a fiber lay up is placed within the cavity 118 adjacent the textured surfaces of the tool, and the tool is sealed as with a tacky tape or other seal as is known in the art. A peel ply may be used if the texture is not to be retained on the part. Alternatively, a peel ply may be omitted if the texture is desired to be retained on the surface of the part. Forming the texture on the part imparts some further stiffness to the part and may be desired for aesthetic reasons as well. The fiber lay up may comprise cores wrapped with fiber material as discussed above. Fittings are inserted into the main feeder grooves through punctures made in the sheet as discussed above. A vacuum is applied to the interior of the tool, and the sheet of textured material is pulled adjacent the fiber lay up such that the tops of the upraised portion contact the fiber lay up, but the valleys remain open to form a network of narrow, interconnected passageways through which resin is able to flow. Under the vacuum, resin is drawn first into the main feeder grooves and then into the valleys. From the valleys, the resin is able to fully impregnate the fiber material, flowing finally to the vacuum outlet channels around the perimeter. The resin is allowed sufficient time to cure. After curing, the part is removed from the tool.

In an alternative embodiment, the textured sheet can be used as a lid in conjunction with a conventional mold. The fiber lay up is placed against the mold surface. The textured sheet is placed over the fiber lay up and sealed to the mold in any suitable manner. Additional resin distribution media may need to be used adjacent the conventional mold surfaces. Resin impregnation occurs as discussed above.

The textured sheet can also be used as a master mold which is used to make tools from other materials, such as ceramics. The tool is then used as a mold in the resin impregnation process. In this case, the sheet comprises a negative of the tool; that is, the side of the sheet having the indentations is used to form the tool. The resulting tool has the configuration of the upraised portions separated by the valleys, which form a resin distribution medium as discussed above. A ceramic mold generally does not flex to collapse against the part under vacuum. In this case, a separate vacuum bag is used in conjunction with the mold, as is known in the art.

FIGS. 14 through 21 illustrate further embodiments of the invention, which are particularly suitable for forming sandwich-type structures such as hollow-core or foam core panels. The structure is formed by a plurality of cores 132, which may be hollow cells (FIG. 14) or foam blocks (FIG. 21), arrayed according to the desired finished part to be formed. One or more layers of fiber material 134 covers the top surfaces 136 and bottom surfaces 138 of the arrayed cores to form face skins of the structure. Fiber material may also be located within the regions 140 between each core 132 and/or the cores may be wrapped with a fiber material 135 partially or fully about the sides of the cores. In this manner, each core may be covered partially or fully with a fiber material. The fiber material may be a cloth or mat formed from fibers of glass, carbon, KEVLAR, or other suitable material. The fiber material may be wrapped in a sheet around the core, or individual pieces of fiber material may be applied to the desired core faces. The fiber may also be supplied in a tubular form into which the core is inserted. As indicated in FIGS. 17A through 17D, the fiber may surround the sides of the cores and terminate at the top and bottom, may terminate some distance above and/or below the core, may wrap slightly onto the top and/or bottom of each core, or may wrap completely onto the top and bottom of each core. The fiber material surrounding and between the cores creates structural members such as shear ties, compression webs, and beams. Advantageously, the fiber material can be supplied as a multiaxial braid, i.e., having fibers running in multiple directions to carry stresses running in different directions, such as biaxial, triaxial, or quadra-axial braid. The orientation of the braid fibers can be chosen to suit the structural requirements of the finished part.

Figure 15:
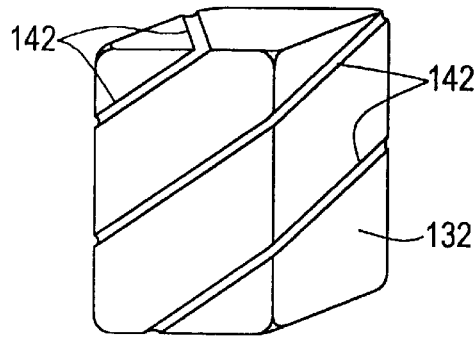
FIG. 15 is a perspective view of a closed cell used in the composite structure of FIG. 14.
Figure 16A:
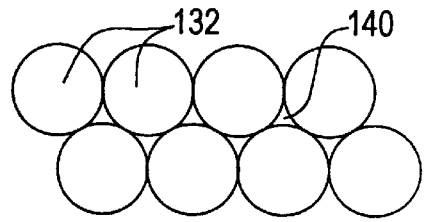
FIGS. 16A, 16B, 16C, and 16D illustrate a variety of arrangements of the cores used in the composite structure of FIG. 14.
Figure 16B:
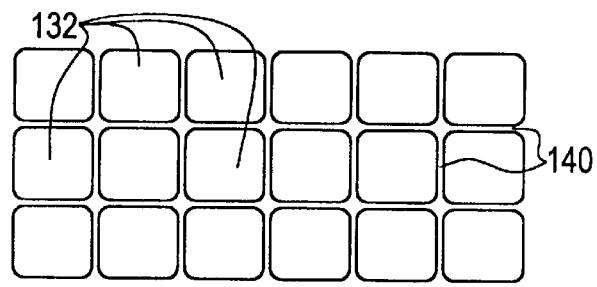
Figure 16C:
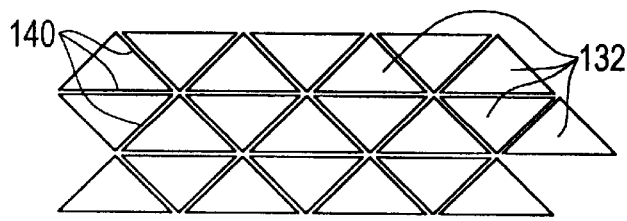
Figure 16D:
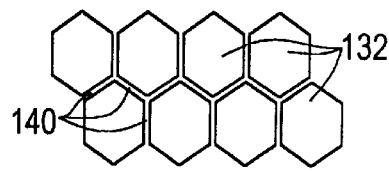
Figure 20:
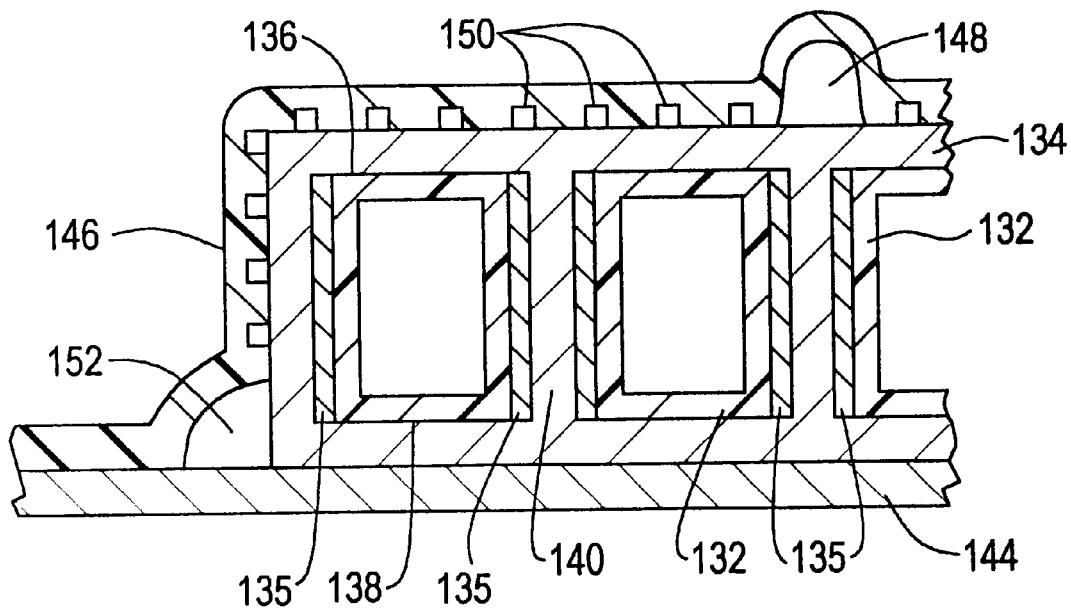
FIG. 20 is a schematic, partial cross-sectional view of a further configuration of a composite structure and mold assembly according to the present invention.

FIG. 15 illustrates a hollow core 132 comprising a closed container or cell having one or more grooves 142 integrally formed in the sides. Preferably, each hollow core is formed from a plastic material, such as a polyethylene, polypropylene, polyvinyl chloride (PVC), or nylon. The cores can be formed by a blow molding process, as would be known in the art. Other processes, such as injection molding, twin sheet vacuum forming, or roto molding, can also be used. With a blow molded cell, the grooves are typically V-shaped in cross-section, since the V shape aids in removing the cells from the mold. However, other shapes, such as a U shape, can be used. The grooves 142 are sized, as discussed above, to facilitate resin flow therealong. Typically the grooves function as microgrooves. In general, the larger the core, the larger the cross-sectional area of the grooves. Main feeder grooves are generally not necessary in the surfaces of the cores, although one or more feeder grooves could be provided if desired, particularly if the core were large. The grooves can be formed in any suitable configuration, such as the diagonal configuration shown in FIG. 15. The diagonal configuration provides for easy release from the blow molding apparatus. Preferably, the grooves circumscribe the core to facilitate resin transport to all sides of the cores. The corners of the cores are also preferably rounded or chamfered, which further facilitates resin flow around the sides of the cores. In some cases, particularly if the cores are small, such as one or two inches on a side, rounded corners alone may be sufficient to facilitate resin flow without additional grooves in the core surfaces as indicated in FIGS. 18 and 19. The cores can have any suitable shape, such as rectangular boxes (shown in FIG. 15), cylinders, or elongated triangles or hexagons, and may be arranged in any suitable pattern, as shown in FIGS. 16A through 16D.

Figure 14:
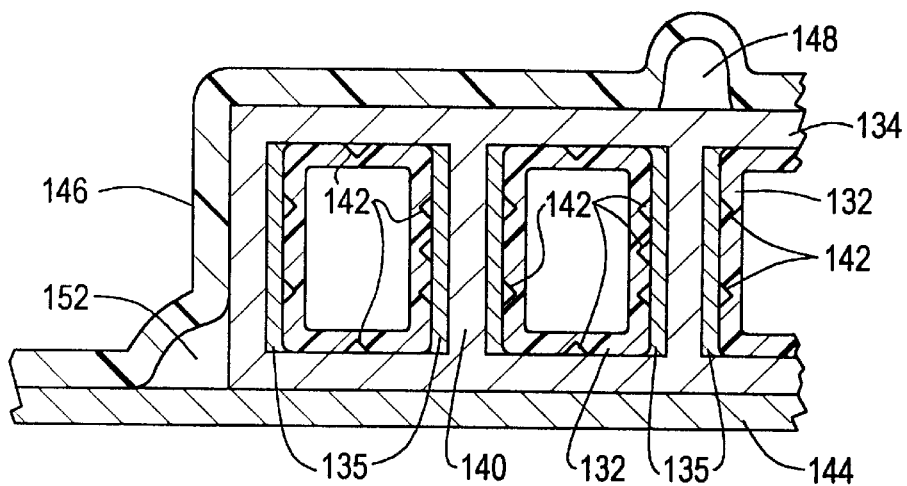
FIG. 14 is a schematic, partial cross-sectional view of a composite structure and mold assembly according to a further embodiment of the invention.
Figure 21:
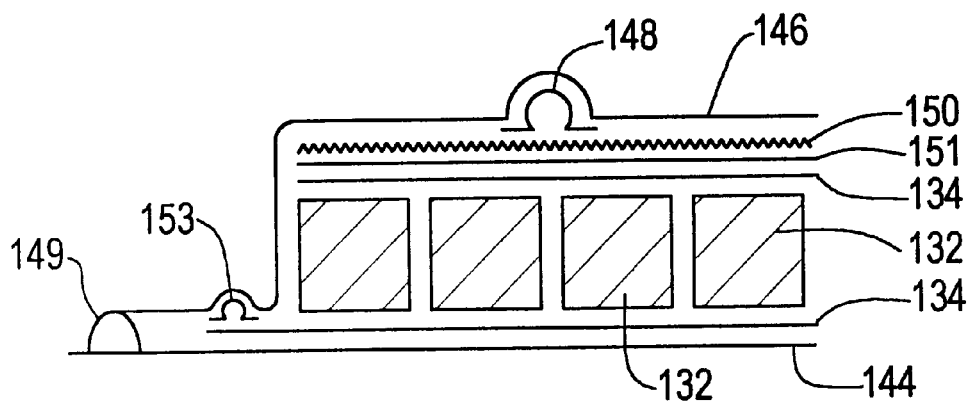
FIG. 21 is a schematic, partial cross-sectional view of a still further configuration of a composite structure and mold assembly according to the present invention.

The cores 132, which may be wrapped with the fiber material 135, are arranged against the rigid surface 144 of a mold assembly. FIG. 14 illustrates an embodiment in which the cores are wrapped on all sides with a fiber material. FIGS. 18 and 19 illustrate an embodiment in which the cores 132 are not wrapped with a fiber material or provided with grooves, and the resin flows from the upper to the lower surface via rounded corners 133 on the cores. The mold assembly includes a flexible portion which is generally a vacuum bag 146 placed over the structure and affixed to the mold surface with a seal 149 about the periphery. The vacuum bag includes one or more main feeder channels 148, which may be formed integrally with the bag (FIG. 14) or separately therefrom (FIG. 21). A resin distribution network of small, intersecting channels 150 may be provided for fluid communication with the main feeder channel(s) 148. The smaller channels can be formed integrally with the vacuum bag (illustrated in FIG. 20), as described in U.S. Pat. Nos. 5,439,635 and 5,316,462, incorporated herein by reference. The smaller channels can also be provided by a separate distribution medium (illustrated in FIG. 21), as described above and in U.S. Pat. Nos. 5,0952,906 and 4,902,215. A peel ply 151 (illustrated in FIG. 21) may be used if desired. A vacuum channel 152 or bleeder 153, connected to a vacuum source (not shown), is also provided about the periphery of the structure.

A resin supply (not shown) is connected directly into the main feeder channel(s) 148 in the vacuum bag 146. A vacuum is drawn via the vacuum channel 152, which evacuates air from the pores in the fiber material. The resin supply is opened, and resin is drawn by the vacuum relatively quickly into the main feeder channel(s) 148 and through the smaller channels 150 of the vacuum bag or separate distribution medium. The resin penetrates the fiber material 134 covering the upper surface 136 of the cores 132 and reaches the surface of the cores. The resin again travels relatively quickly along the grooves 142 of the cores 132, thereby penetrating the fiber material 135 in the regions 140 between adjacent cores and between the cores and the mold 144. A resin with a low viscosity can be used, which also aids in rapid travel along the microgrooves and penetration of the fiber material. When the cores are hollow cells formed at atmospheric pressure, they push outwardly against each other and the fiber material while under vacuum. This minimizes the pore spaces in the fiber material and ensures that a minimum amount of resin is used.

The resulting composite structure is quite strong. Various deck configurations with 4 and 5 foot spans and approximately 8 inch depths were loaded until failure; the decks failed at loads ranging from 31 to 92 kips. The webs, in the regions 140 between the cores, are structurally continuous. That is, webs extending in one direction do not physically cross through webs extending in another direction. Their stresses, however, act as if the webs were continuous in both directions. This enables shear loads to be transferred to adjacent webs. Additionally, a panel formed in this manner can be thinner than, for example, a structurally equivalent steel structure, since steel I beams extending in a first direction cannot in practice cross through I beams extending in another direction. Also, the cores remain in the structure and can contribute to the structure's strength. Additionally, the resin in the microgrooves remains after curing, increasing interlaminar shear strength and delamination strength, and provides additional resistance to buckling.

The cores of the present invention can be arranged more than one core deep, if desired. In this case, fiber material is placed between layers of cores. This configuration is advantageous to provide, for example, fire hardening or earthquake resistance. For fire hardening, if one layer burns off, another layer may still be left in place. For earthquake resistance, additional strength can be provided by multiple layers of cores.

The invention is not to be limited by what has been particularly shown and described, except as indicated by the appended claims.

We claim:

1. A composite structure comprising:

cores each having a peripheral surface having a top face, a bottom face, and side faces, the cores arranged in a layer with ones of the side faces disposed in opposition to others of the side faces, the layer having an upper surface defined by each top face, and a lower surface defined by each bottom face, each peripheral surface having a configuration to provide channels between at least some of the side faces between adjacent ones of the cores from the upper surface to the lower surface which form a resin distribution network;

a fiber material forming an upper face skin and a lower face skin over the layer of cores; and a cured resin impregnating the fiber material and the network of channels to provide one or more structural members extending from the upper surface to the lower surface.

2. The composite structure of claim 1, wherein each core is a closed hollow cell.

3. The composite structure of claim 1, wherein each core is a blow molded container.

4. The composite structure of claim 1, wherein each core is formed from a polyethylene material, a polypropylene material, a polyvinyl chloride material, or a nylon material.

5. The composite structure of claim 1, wherein each core is surrounded between the upper surface and the lower surface by a further fiber material.

6. The composite structure of claim 1, wherein the further fiber material surrounding each core is a multiaxial braided fabric.

7. The composite structure of claim 1, wherein each core has rounded edges.

8. The composite structure of claim 1, wherein the configuration of the peripheral surface in each core forms at least one channel that circumscribes the core.

9. The composite structure of claim 8, wherein the channel is V-shaped.

10. The composite structure of claim 1, wherein each core is box-shaped.

11. The composite structure of claim 1, wherein each core is cylindrical.

12. The composite structure of claim 1, wherein each core is in the shape of an elongated triangle.

13. The composite structure of claim 1, wherein each core is in the shape of an elongated hexagon.

14. The composite structure of claim 1, wherein the cores are arranged in an array having a plurality of rows and the structural members provided by the cured resin extend between the cores in at least two directions.

15. The composite structure of claim 14, wherein the structural members extend in mutually perpendicular directions.

* * * * *